United States Patent Office 2,899,825
Patented Aug. 18, 1959

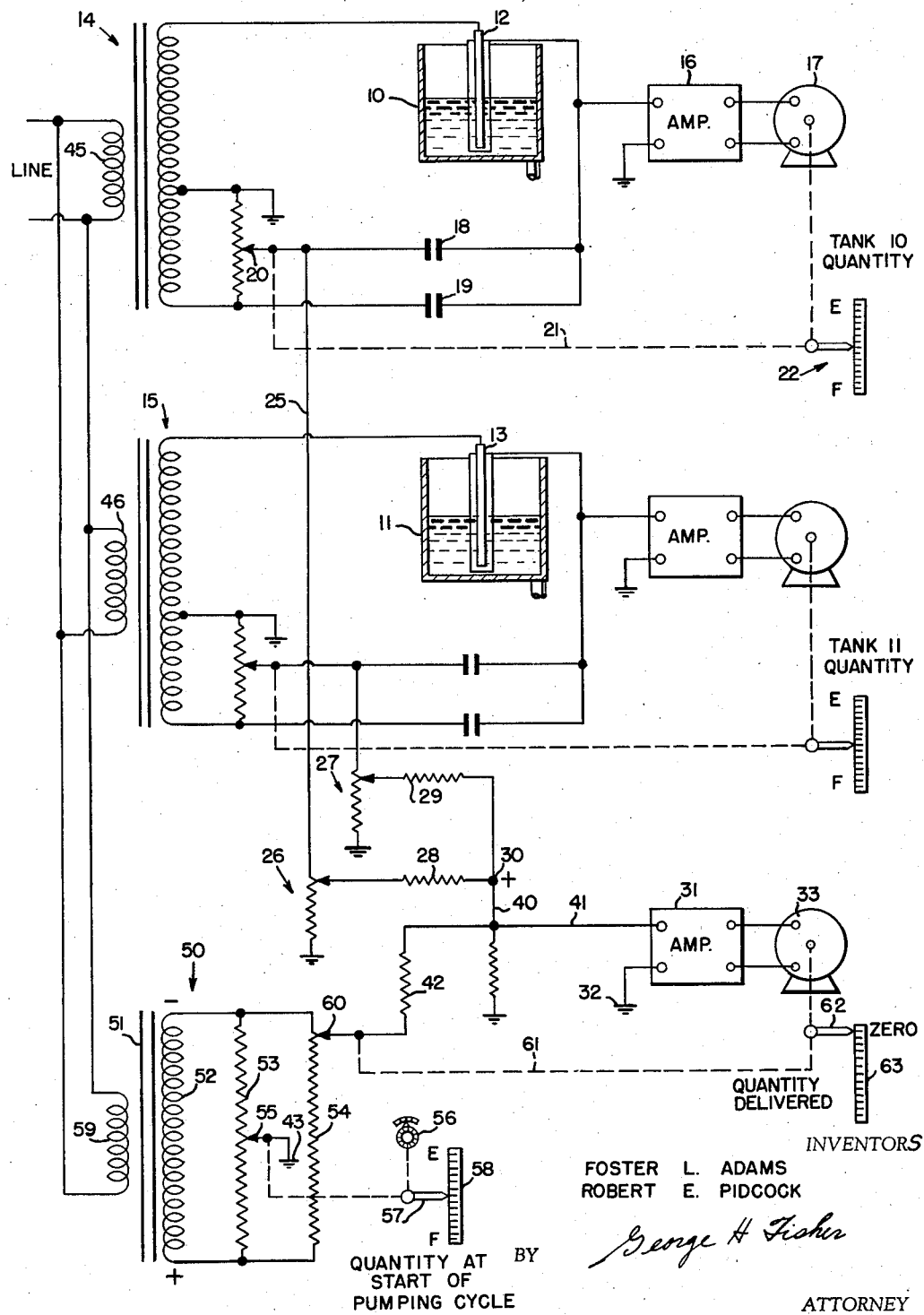

2,899,825

FLUID QUANTITY MEASURING APPARATUS

Foster L. Adams, Pomona, Calif., and Robert E. Pidcock, Minneapolis, Minn., assignors to Minneapolis-Honeywell Regulator Company, Minneapolis, Minn., a corporation of Delaware Application October 4, 1954, Serial No. 460,134

6 Claims. (Cl. 73—304)

The present invention is concerned with a fluid measuring apparatus and more particularly with apparatus for measuring the quantity of fluid removed from fluid storage means.

The present invention is particularly adapted for use with a tankar type vehicle which contains a fluid storage means and is adapted to accurately measure the quantity of fluid withdrawn from the fluid storage means.

Such an apparatus is of particular importance with the advent of the tankar type aircraft, which aircraft carries a large quantity of aviation fuel and refuels other aircraft while airborne. Such a tankar type aircraft normally includes a means for pumping fuel from its fuel storage means to the aircraft being refueled. It can be seen that unless the pumping means is accurately controlled, too large a quantity of fuel may be delivered to the aircraft being refueled, which condition would be very dangerous.

It is therefore an object of the present invention to provide an improved apparatus for measuring the quantity of fluid withdrawn from fluid storage means, which apparatus includes as a part thereof a means for indicating the quantity of fuel in the fuel storage means.

It is a further object of the present invention to provide an apparatus having means to supply a signal indicative of fluid quantity in fluid storage means, means including an indicator having indicia of fluid quantity to supply a signal to oppose the signal indicative of fluid quantity, and manual means to modify the signal supplied by the last named means to cause the indicator to indicate zero and to subsequently indicate the fluid withdrawn from the fluid storage means.

It is a further object of the present invention to provide an apparatus for measuring the quantity of fuel delivered from a fuel storage means, which apparatus includes a first and a second calibrated potentiometer such that movement of the first potentiometer causes movement of the second potentiometer to the zero position wherein the first potentiometer now reads the fuel quantity and the second potentiometer will read the fuel subsequently withdrawn from the fuel storage means.

These and other objects of the present invention will become apparent upon reference to the following specification, claims and drawings, of which the single figure is a schematic representation of the present invention.

Referring to the single figure, the reference numerals 10 and 11 designate a first and a second fuel tank which may be located in a tankar type aircraft. This tankar type aircraft normally includes a means, which can be manually operated, whereby a member of the crew of the aircraft causes fuel to be pumped from the tanks 10 and 11 to be delivered to an aircraft being refueled. A means must therefore be provided whereby the crew member can determine the quantity of fuel which has been delivered to the aircraft being refueled and can control the pump which is delivering fuel from tanks 10 and 11 to stop such delivering of fuel at the proper time.

Associated with each of the tanks 10 and 11 is a fuel quantity measuring system designated generally by the reference numerals 14 and 15. This fuel quantity measuring system is substantially identical to that disclosed in the copending application of John W. Bancroft, Ser. No. 181,747, filed August 28, 1950, now Patent 2,793,-529.

While the fuel quantity measuring systems 14 and 15 are particularly adapted for use in this invention, it will be recognized that other fuel quantity measuring systems which provide a voltage indicative of fuel quantity could be used. Fuel quantity measuring systems 14 and 15 will be described briefly. In each of the fuel tanks 10 and 11 is located a capacitive type tank unit 12 and 13 respectively, which may be of the general type shown in the LeRoy A. Griffith Patent 2,563,281.

Referring now to system 14, the capacitive tank unit 12 forms one leg of a capacity bridge. Fixed capacitors 18 and 19 form the other leg of the capacity bridge and the output of the bridge is connected to an amplifier 16. The output of amplifier 16 controls a motor 17 to position a potentiometer tap 20 by means of a mechanical connection designated by the dotted line 21, to thereby control the potential across capacitor 18 to rebalance the capacity bridge. The amplifier 16 may be of the type shown in the Albert P. Upton Patent 2,423,534. This amplifier is phase sensitive and causes rotation of motor 17 in a first or a second direction depending upon phase of input voltage applied to ampliger 16. Associated with motor 17 is an indicator 22 which is controlled thereby and indicates the quantity of fuel in tank 10.

The fuel quantity measuring system 15 is identical to fuel quantity measuring system 14 and operates in the above described manner.

Potentiometers 26 and 27 are connected to the quantity measuring systems 14 and 15 respectively. This connection is such that potentiometer 26 has a voltage applied thereto which has a magnitude indicative of the quantity of fuel in tank 10 while potentiometer 27 has a voltage applied thereto indicative of the quantity of fuel in tank 11. These voltages are then applied through summing resistors 28 and 29 to a terminal 30. It will be recognized that the voltage present on terminal 30 is of a magnitude depending upon the total fuel in tanks 10 and 11. This voltage is supplied to a circuit to be now described.

A source of voltage is designated generally by the reference numeral 50 and consists of a transformer 51 having a secondary 52 with potentiometers 53 and 54 connected in parallel across secondary 52. Associated with potentiometer 53 is a movable tap 55 which is controlled by a manually operable control knob 56 and connected to a reference voltage point at 43. Control knob 56 is also mechanically connected to a pointer 57 which cooperates with a scale 58 that is calibrated in terms of fuel quantity at the start of the pumping cycle.

An amplifier 31 is provided, which amplifier is similar to amplifier 16. Connected to the output of amplifier 31 is a motor 33, which is similar to motor 17. As in the case of amplifier 16 and motor 17, amplifier 31 and motor 33 are operable such that motor 33 is driven in a first or a second direction depending upon the phase of the voltage applied to the input of amplifier 31. Motor 33 is mechanically connected by means of a mechanical connection represented by a broken line 61 to control an indicator comprising a pointer 62 associated with a scale 63, which is calibrated in terms of fuel quantity delivered from the fuel storage means. Motor 33 is also mechanically connected to wiper 60 of potentiometer 54.

The input of amplifier 31 is connected by means of conductors 41 and 40 to terminal 30, and thereby a signal voltage is applied to the input of amplifier 31 which is of a magnitude depending upon the quantity of fuel in the fuel storage means, namely tanks 10 and 11. The input of amplifier 31 is also connected to a reference voltage point at the ground connection 32.

The input of amplifier 31 is also connected through conductor 41 and a summing resistor 42 to the tap 60 of potentiometer 54. This last named connection places a signal voltage on the input of amplifier 31 which is of a magnitude dependent upon the relative positions of potentiometer taps 55 and 60.

In considering the operation of the present invention it must be assumed that the transformer primary windings 45 and 46 associated with fuel quantity measuring networks 14 and 15 respectively are connected to a source of alternating voltage, not shown, in such a manner that for a given half-cycle of the alternating voltage source the terminal 30 will be positive with respect to ground, as shown in the drawing. It must be assumed also that primary 59 of transformer 51 is connected to the power line such that secondary 52 has a polarity such as indicated in the drawing. It will be immediately recognized that this is a well known expedient and that on the opposite half-cycle of the alternating voltage line the polarities will be reversed from that shown on the drawing.

It can be seen from the drawing that tanks 10 and 11 are approximately one-half full of fuel. The indicators associated with the fuel quantity measuring networks 14 and 15 show that each of the individual tanks 10 and 11 are one-half full. Likewise, the voltage present on terminal 30 has a magnitude which is one-half of the voltage magnitude which would exist if tanks 10 and 11 were full.

This voltage present on terminal 30 is applied to the input of amplifier 31 and motor 33 is caused to operate to position potentiometer tap 60 until the voltage present between taps 60 and 55 is equal in magnitude to the potential present from terminal 30 to ground or reference voltage level.

The description of the operation so far has not required the manually movable knob 56, and thereby the potentiometer wiper 55, to be positioned at a given point. Therefore, pointers 57 and 62 may be at any position depending upon the particular setting of knob 56. However, if it is desired to start a pumping cycle, that is, if it is desired to pump fuel from the tanks 10 and 11 to an aircraft to be refueled, then, a member of the crew of the tankar aircraft positions the manually operable knob 56 until the pointer 62 has returned to the zero position such as shown in the drawing. When this has been done, the voltage present from tap 55 to tap 60 will be opposite in phase and equal in magnitude to the voltage present on terminal 30. Also, since the potentiometer tap 60 is effectively connected to the upper terminal of potentiometer 53, as shown, the only voltage effective from power supply 50 is that present across the upper portion of the potentiometer 53.

Therefore, this voltage present across the upper portion of potentiometer 53, which is equal to the voltage present on terminal 30, is indicative of the total fuel quantity in tanks 10 and 11. The position of pointer 57 on scale 58 therefore indicates the fuel quantity at the start of the pumping cycle. This informs the crew member of the tankar aircraft as to the amount of fuel which is available to be delivered.

Once the crewman has caused these conditions to exist by manual movement of knob 56, he can then start the pumping operation to refuel the aircraft being refueled. As fuel leaves tanks 10 and 11 the fuel quantity measuring systems 14 and 15 operate to reduce the voltage present on terminal 30. This causes an unbalanced voltage to be fed into amplifier 31 and causes motor 33 to move both potentiometer tap 60 and pointer 62 in a downward direction. Such movement in a downward direction is necessary to reduce the voltage between taps 55 and 60 to maintain the magnitude of voltage between the taps equal to the voltage on terminal 30.

By viewing the movement of pointer 62 and reading scale 63 the crew member can determine the amount of fuel which has been delivered to the aircraft being refueled and can thereby determine when it is necessary to stop the pumping operation. It will be recognized that automatic means could be provided to perform this function. For example, a physically movable limit switch could be moved to be actuated by pointer 62 upon the pointer reaching a predetermined position, to thereby stop the pumping operation.

It can therefore be seen that an improved apparatus for measuring the quantity of fuel delivered from a fuel storage means has been provided. While a certain embodiment of the present invention has been shown, modifications will readily occur to those skilled in the art, and it is intended that the invention be limited only by the scope of the appended claims.

We claim as our invention:

1. Fluid quantity measuring apparatus for use with fluid storage means comprising; electrical means for deriving a signal voltage of a first sense indicative of the fluid quantity in the fluid storage means; a source of voltage, a first and a second potentiometer each having a movable tap, means connecting said first and second potentiometers in parallel to said source of voltage; voltage responsive means; means connecting said voltage responsive means to said electrical means to apply a signal voltage of a first sense thereto, means connecting said voltage responsive means to said taps of said first and second potentiometers in a manner to apply a signal voltage thereto of a second sense opposite to said first sense; manually operable means connected to the tap of said first potentiometer to control the position thereof; drive means connected to said voltage responsive means to be controlled thereby, rebalance means connecting said drive means to the tap of said second potentiometer to control the position thereof, and a scale bearing indicia of quantity of fluid delivered associated with said drive means so that operation of said manually operable means causes said drive means to indicate a predetermined reading and subsequent change of fluid quantity will be indicated on said scale as said signal voltage of said first sense changes in magnitude with the quantity of fluid in the storage means and said drive means positions the tap of said second potentiometer to change the magnitude of said signal voltage of said second sense.

2. In combination, fluid storage means, electrical means associated therewith for deriving a signal voltage of a magnitude dependent upon the quantity of fluid in said storage means; a source of voltage, a first and a second potentiometer each having a movable tap and being calibrated in terms of fluid quantity, means independently connecting said first and second potentiometers to said source of voltage so that the voltage between the taps may be either zero, of a first sense or of an opposite sense; voltage responsive means having a pair of input terminals, means connecting said electrical means to said input terminals to apply a first signal voltage thereto of a magnitude dependent upon fluid quantity in said storage means, means connecting the taps of said first and second potentiometers to said input terminals in a manner to apply thereto a second signal voltage to oppose said first signal voltage and of a magnitude dependent upon the relative position of the taps of said first and second potentiometers; means controlled by said voltage responsive means for moving the tap of said first potentiometer to cause said second signal voltage to be equal in magnitude to said first signal voltage whenever such a condition does not exist; and manually operable means for moving the tap of said second potentiometer, whereby continued movement of said last named means until said first potentiometer indicates zero quantity causes the quantity of fluid in said storage means to be readable on said second potentiometer and the quantity of fluid subsequently withdrawn from said storage means is continuously readable on said first potentiometer.

3. A apparatus for use with liquid storage means to indicate the quantity of liquid withdrawn therefrom, comprising: electrical means for deriving a signal voltage of a first sense indicative of the quantity of liquid in the storage means and having a pair of output terminals; a source of voltage having a first and a second movable tap with the voltage therebetween being a function of the relative positions of said taps; voltage responsive means having a pair of input terminals; means connecting the output terminals of said electrical means to the input terminals of said voltage responsive means to apply a signal voltage of a first sense thereto; means connecting said first and second movable taps one to each of said pair of input terminals of said voltage responsive means in a manner to apply a voltage thereto of a second sense opposite from said first sense and of a magnitude dependent upon the relative positions of said taps; means controlled by said voltage responsive means to cause movement of said first tap to cause said voltage of said second sense to equal said voltage of said first sense whenever such a condition does not exist; a first indicator means calibrated in terms of liquid quantity and having a movable member, means connecting the movable member of said first indicator means to said means controlled by said voltage responsive means; and manually movable means including a second indicator calibrated in terms of liquid quantity connected to said second tap to control the movement thereof whereby adjustment of said manually movable means to effect a zero reading on said first indicator will cause said second indicator to indicate the quantity of liquid in the storage means and the quantity of liquid subsequently withdrawn from the storage means will be indicated on said first indicator.

4. An apparatus for use with fluid storage means to indicate the quantity of fluid withdrawn therefrom comprising: electrical means having a fixed reference voltage point and having an output terminal and arranged to derive a voltage thereon of a first sense with respect to the reference voltage point which is of a magnitude indicative of the quantity of fluid in the storage means; a source of voltage having a first movable tap connected to the reference voltage point and having a further movable tap with the voltage thereon being of a second sense with respect to the reference voltage point and of a magnitude dependent upon the relative positions of said taps; voltage responsive means having a pair of input terminals one of which is connected to the reference voltage point; means connecting the output terminals of said electrical means and said further tap to the other of said pair of input terminals of said voltage responsive means in a manner to cause said voltages of said first and second senses to be in opposition; means controlled by said voltage responsive means connected to said further tap to control the movement thereof to cause said voltage of said second sense to be equal to said voltage of said first sense whenever such a condition does not exist; first indicator means calibrated in terms of fluid quantity connected to be controlled by said voltage responsive means; and manually movable means including a second indicator calibrated in terms of fluid quantity connected to said first tap to control the adjustment thereof whereby adjustment of said manually movable means to effect a zero reading on said first indicator will cause said second indicator to indicate the quantity of fluid in the storage means and the quantity of fluid subsequently withdrawn from the storage means will be indicated on said first indicator.

5. Apparatus for use with fluid storage means for sensing the quantity of fluid withdrawn therefrom, comprising: electrical means for deriving a signal voltage of a magnitude dependent upon the quantity of fluid within the storage means and having a first pair of output terminals; a voltage source having a second pair of output terminals both of which are separate from said first pair of output terminals; voltage responsive means; means connecting said first pair of output terminals to said voltage responsive means to apply a first voltage thereto having a magnitude dependent upon the quantity of fluid in the storage means; means connecting said second pair of output terminals to said voltage responsive means in a manner to apply a second voltage thereto which opposes said first voltage and has a magnitude dependent upon the voltage between said second pair of output terminals; means controlled by said voltage responsive means to vary the voltage present between said second pair of output terminals to cause said second voltage to be equal to said first voltage whenever such a condition does not exist; a first indicator controlled by the means controlled by said voltage responsive means and calibrated in terms of fluid quantity; and manually movable means including a second indicator calibrated in terms of fluid quantity arranged to vary the voltage between said second pair of output terminals whereby adjustment of said manually movable means to effect a zero reading on said first indicator will cause said second indicator to indicate the quantity of fluid in the storage means and the quantity of fluid subsequently withdrawn from the storage means will be indicated on said first indicator.

6. Apparatus for use with a tankar aircraft having a fuel storage means, comprising: electrical means for deriving a voltage indicative of the quantity of fuel in the fuel storage means; a source of voltage; a first and a second potentiometer each having an adjustable tap; means connecting said first and second potentiometers to said source of voltage so that the voltage between the taps may be either zero, of a first sense, or of an opposite sense; voltage responsive means having voltage input means and output means; means connecting said input means to said electrical means to apply the voltage indicative of fuel quantity to said input means; means connecting the taps of said first and second potentiometers to said input means in a manner to apply a voltage thereto which opposes said voltage indicative of fuel quantity and which is of a magnitude dependent upon the relative adjustment of said potentiometer taps; motor means connected to the output means of said voltage responsive means to be controlled in accordance with voltage applied to said input means; a first indicator controlled by said motor means and calibrated in terms of fuel quantity; means connecting said motor means to the tap of said first potentiometer to control the adjustment thereof; manually movable means including a second indicator calibrated in terms of fuel quantity; and means connecting said manually movable means to the tap of said second potentiometer to control the adjustment thereof, whereby adjustment of said manually movable means to effect a zero reading on said first indicator will cause said second indicator to indicate the quantity of fuel in the storage means, and the quantity of fuel subsequently withdrawn from the storage means will be indicated on said first indicator.

References Cited in the file of this patent

UNITED STATES PATENTS

| | | |
|---|---|---|
| 2,563,280 | Schafer | Aug. 7, 1951 |
| 2,638,000 | Sontheimer | May 12, 1953 |
| 2,656,977 | Cummings | Oct. 27, 1953 |
| 2,689,932 | Hornfeck | Sept. 21, 1954 |